(12) United States Patent
Kondo

(10) Patent No.: US 8,384,676 B2
(45) Date of Patent: Feb. 26, 2013

(54) KEYBOARD DEVICE AND KEYBOARD COVER

(76) Inventor: Toshihiko Kondo, Koto-ku (JP)

( * ) Notice: Subject to any disclaimer, the term of this patent is extended or adjusted under 35 U.S.C. 154(b) by 711 days.

(21) Appl. No.: 12/092,091

(22) PCT Filed: Oct. 31, 2005

(86) PCT No.: PCT/JP2005/020002
§ 371 (c)(1),
(2), (4) Date: Apr. 30, 2008

(87) PCT Pub. No.: WO2006/073022
PCT Pub. Date: Jul. 13, 2006

(65) Prior Publication Data
US 2009/0122013 A1  May 14, 2009

(51) Int. Cl.
*G06F 3/02* (2006.01)
*G09G 5/00* (2006.01)
(52) U.S. Cl. ......... 345/173; 400/489; 400/490; 400/494
(58) Field of Classification Search .......... 345/168–172; 400/489–490, 494
See application file for complete search history.

(56) References Cited

U.S. PATENT DOCUMENTS

| | | | | |
|---|---|---|---|---|
| 6,050,825 A * | 4/2000 | Nichol et al. | | 434/227 |
| 6,199,996 B1 | 3/2001 | Katrinecz, Jr. et al. | | |
| 6,752,552 B1 | 6/2004 | Sabato | | |
| 6,850,225 B1 * | 2/2005 | Whitcroft | | 345/168 |
| 2003/0197627 A1 | 10/2003 | Botich | | |

FOREIGN PATENT DOCUMENTS

| | | |
|---|---|---|
| GB | 365928 | 1/1932 |
| JP | 60-20640 | 2/1985 |
| JP | 61-53771 | 4/1986 |
| JP | 63-151036 | 10/1988 |
| JP | 7-13029 | 3/1995 |
| JP | 08-234882 | 9/1996 |
| JP | 09-081292 | 3/1997 |
| JP | 2002-23923 | 1/2002 |
| JP | 2002-049456 | 2/2002 |
| JP | 2002-091663 | 3/2002 |

(Continued)

OTHER PUBLICATIONS

Human translation of JP 61-053771.*
Second Office Action issued in Chinese Patent Application No. 200580051954.4, dated Dec. 6, 2010, and English translation, 12 pp.

(Continued)

*Primary Examiner* — Michael Pervan
(74) *Attorney, Agent, or Firm* — Nixon & Vanderhye P.C.

(57) ABSTRACT

A label having an identifier 41L is applied to the upper left corner of the key top of each character key in a left hand region of a keyboard device. A label having an identifier 41R is applied to the upper right corner of the key top of each character key in a right hand region. The identifier 41L is a mark of a reversed L shape and the identifier 41R is a mark of a mirror image pattern of the identifier 41L. Further, different colors are applied to the identifiers 41L and 41R depending on regions for individual fingers. As a consequence, the identifiers 41L and 41R have a function to visually display information representing which hand is to be used to press a key and information representing which finger is to be used to press the key. The keyboard device enables a user to naturally understand the arrangement of the keys and the use of the fingers.

14 Claims, 6 Drawing Sheets

FOREIGN PATENT DOCUMENTS

| | | |
|---|---|---|
| JP | 2002-244790 | 8/2002 |
| JP | 3089508 | 8/2002 |
| JP | 2003-502760 | 1/2003 |
| WO | WO 9819227 A1 * | 5/1998 |
| WO | WO 00/12931 | 3/2000 |
| WO | WO 00/78551 | 12/2000 |

OTHER PUBLICATIONS

Third Office Action issued in Chinese Patent Application No. 200580051954.4, dated Jun. 2, 2011, and English translation, 20 pp.

Supplementary Extended European Search Report dated Apr. 5, 2012 issued in European Patent Application No. 05805455.2, 7 pp.

* cited by examiner (A)

(B)

(A)

(B)

(A)

(B)

(A)

(A)

(A)

(B)

KEYBOARD DEVICE AND KEYBOARD COVER

This application is the U.S. national phase of International Application No. PCT/JP2005/020002 filed 31 Oct. 2005 which designated the U.S., the entire content of which is hereby incorporated by reference.

TECHNICAL FIELD

The present invention relates to a keyboard device and a keyboard cover.

BACKGROUND ART

With the broad commercialization of personal computers, a wide range of consumers covering children to middle-aged and senior adults have begun to actively use the Internet, multimedia, etc. via the personal computers. The reason personal computers became so familiar to the wide range of consumers is because the operating system (OS) based on GUI (Graphical User Interface) is currently adopted in almost all computers. Namely, owing to the GUI, the user can easily operate the personal computer by using a pointing device such as a mouse while looking at the display. Therefore, occasions, in which the user is required to perform input via the keyboard (hereinafter referred to as "key input"), have decreased substantially than with a conventional OS based on characters, which in turn makes the personal computer more user-friendly even to a user who is not very good at the key input.

Nevertheless, it is not possible to perform all the operations only via the mouse. For example, the character (letter) input is essential upon generating an email document to be sent by using e-mail software or upon generating a document by using word processing software. Among character input devices, keyboard devices are the most commonly used input devices and are included in almost all the personal computers as standard equipment.

There are several types of key arrangements on a keyboard device, namely arrangement of keys via which the alphabet and symbols are inputted. In English-speaking countries, the so-called "QWERTY" arrangement is the most widely adopted arrangement. The QWERTY arrangement was made for early types of mechanical typewriters by intentionally arranging the typebars for frequently used characters at left-right positions away from one another because in the early mechanical typewriters when such frequently used typebars were struck too quickly, the typebars were jammed and consequently broken. In the French-speaking countries, the "AZERTY" arrangement is used in which the arrangement of the letters "Q" and "W" in the QWERTY arrangement are interchanged for that of the letters "A" and "Z", respectively. In the German-speaking countries, the "QWERTZ" arrangement is used in which the arrangement of the letter "Z" is interchanged for that of the letter "Y" in the QWERTY arrangement. In addition to those described above, for example, the "Dvorak" arrangement developed based on the character frequency in the English language is also used. In any of these key arrangements, there is no apparent rule by which the keys are arranged, and the task of memorizing all the uninteresting or irregular key arrangements is hard and burdensome particularly for a beginner user, which in turn becomes one of the main factors for discouraging the beginner user from inputting (key-typing) via the keyboard.

In addition, a user, who is not accustomed to the key-typing, often types with a self-taught typing method such as a so-called one-fingered or two-fingered typing method for typing using only one or both of the index fingers. In such a case, every time the user strokes (presses) a key, the user must look at the letter engraved or printed on the key to confirm whether or not the right key is being stroked. Therefore, this method has disadvantages that typing speed is slow. In addition, since the user must look alternately at the display and the keyboard, the flow of thought is interrupted. Therefore, the technique of the so-called touch typing (blind typing) requiring the use of all the fingers of both hands without looking at the keyboard is essential to correct and quick typing.

There are many commercially available typing-tutor softwares for learning touch typing. Although many users attempt to practice touch typing by using such softwares, the majority of the users give up before learning touch typing. That is, even a beginner user can touch type by using such a tutor software because the software is devised with functions, for example, for showing a keyboard image on the display while the user is practicing touch typing by using the software, thereby enabling the user to type without looking at the keyboard. However, once the user quits the software, the functions become unavailable to the user. Therefore, when the user is still practicing touch typing but a document must be generated by touch typing, the user must touch type by oneself, which often results in the user reverting back to the self-taught typing method. In such a manner, the majority of users spends time between touch-typing practice and the self-taught typing repeatedly and eventually reverts back to the self-taught typing. The tutor software is originally intended that the user preferably uses the software and keeps practicing until the user completely masters touch typing, but many of the users are not patient enough to do so.

In view of the above situation, there is proposed the usage of a keyboard device or a keyboard cover adopted for practicing touch typing, rather than practicing touch typing by using software only. For example, Japanese Patent Application laid-open No. 2002-091663 discloses a keyboard cover which is provided with projections partitioning typing areas designated for the fingers respectively or a keyboard cover in which areas designated for the fingers respectively are colored differently (color-differentiated), for the purpose of performing touch typing with the fingers placed at the correct positions.

DISCLOSURE OF THE INVENTION

Problem to be Solved by the Invention

The tutor software for practicing touch typing is effective only during the time when the software is running, and the user must secure much time for practice so as to master touch typing. Further, upon using the keyboard device or the keyboard cover in which the typing areas designated to the fingers respectively are partitioned or color-differentiated, it is not easy to intuitively correspond a key among the keys included in a same area to the finger with which the key is to be depressed or pressed. Therefore, the user must secure much time to practice touch typing.

An object of the present invention is to provide a keyboard device and a keyboard cover with which the user can naturally understand the key arrangement and the finger operation during everyday use, even without securing special time for practice to master touch typing.

Means for Solving the Problem and Effects of the Invention

The inventor conducted experiments by making and considering many keyboard samples about the character keys on the keyboard and the shape and position of identifiers via which the relationship between the character keys and the fingers with which the keys are to be pressed can be understood intuitively. Through the experiments and considerations, the inventor found out that by introducing identifiers for the left-hand fingers and the right-hand fingers, separately from identifiers for the type of fingers, it is possible to easily and instantly correspond the character keys with the fingers even when the character keys are formed to have identical shapes. Thus, the inventor arrived at the present invention.

According to a first aspect of the present invention, there is provided a keyboard device comprising a plurality of character keys having identical shapes, each of the character keys including: a left-right identifier identifying whether each of the character keys is to be pressed with a finger of the left hand or a finger of the right hand; and a finger identifier identifying a kind of the finger with which each of the character keys is to be pressed.

According to the invention, each of the character keys has the left-right identifier identifying whether the key is to be pressed with which one of the left and right hands, and the finger identifier identifying whether the character key is to be pressed with which finger of the left or right hand. Accordingly, even when the user is typing while looking at the keyboard, the user can instantly grasp or understand visually (or sensory), upon pressing every key, with which finger of which hand the key is to be pressed. In addition, since the character keys are formed to have mutually identical shapes, the cost for construction of the character keys (in particular, for molding of the keys) is same as with a conventional technique, thereby facilitating the assembly and production of the character keys. The left-right identifier and the finger identifier may be formed in a same mark.

In the keyboard device of the present invention, each of the character keys may have the left-right identifier and the finger identifier on a front surface of each of the character keys. Alternatively, each of the character keys may have the left-right identifier and the finger identifier on a key top of each of the character keys. By providing the left-right identifier and the finger identifier at a position easily recognizable (seeable) when the keyboard device is used, the left-right identification (discrimination) and the finger identification can be fully realized. The left-right identifier and the finger identifier may be formed in a same mark.

In the keyboard device of the present invention, the left-right identifier and the finger identifier may be detachably provided. For some users, the left-right identifier and the finger identifier are attached only to a character key or keys for which finger operation the user is not fully confident, thereby making it possible to efficiently practice touch typing. In addition, for a user who has mastered touch typing, the identifiers are no longer required.

According to a second aspect of the present invention, there is provided a keyboard device comprising a plurality of character keys having identical shapes, each of the character keys including a finger identifier identifying a kind of a finger with which each of the character keys is to be pressed, wherein the finger identifier is provided on each of the characters keys such that the finger identifier is provided on a left side of a character key among the character keys which is to be pressed by the left hand and on a right side of a character key which is to be pressed by the right hand.

According to the present invention, the user can obtain finger information, about which finger is to be used to press the key, from the finger identifier provided on each of the character keys; and the user can obtain hand information about which hand is to be used to press the key, from the position at which the finger identifier is arranged. In particular, when the finger identifier is provided on the left side of the key, it is possible to instantly judge that the key is for a left-hand finger. This is because the position at which the finger identifier is arranged (namely, left or right) directly acts on the brain as the instruction to select the left or right hand (and the finger of the left or right hand). When an identifier for identifying the left or right hand is color-differentiated or shape-differentiated, then there is required an additional step for visually grasping the color or shape of the identifier and then identifying or translating in the brain that the identifier is for the left or right. In such a case, accordingly, the step for recognition is more than in the present invention, thereby considered to delay the judgment and tire the user.

In the keyboard device of the present invention, the finger identifier may be arranged at a side surface of each of the character keys, or may be arranged at a key top of each of the character keys. By arranging the finger identifier at a position at which the finger identifier can be easily seen, the finger identification can be fully realized. According to the experiments conducted by the inventor, it is especially preferable when the finger identifier is arranged in an upturned-L shape or a shape obtained by inverting the upturned L-shape (or in a mirror pattern of the upturned L-shape) along an upper corner portion (corner) of each of the character keys.

In the keyboard device of the present invention, the finger identifier may be detachably provided. By doing so, the user can practice with the finger identifier attached only to the key or keys for which finger operation the user is not fully confident. In addition, after mastering touch typing, all the identifiers can be removed from the keys.

According to a third aspect of the present invention, there is provided a keyboard cover comprising key cover cells which cover a plurality of character keys of a keyboard device respectively, the character keys having identical shapes, each of the key cover cells including: a left-right identifier identifying whether each of the character keys is to be pressed with a finger of the left hand or a finger of the right hand; and a finger identifier identifying a kind of the finger with which each of the character keys is to be pressed.

According to the present invention, the keyboard cover of the present invention can be attached to a commercially available keyboard to thereby provide the left-right identifier and the finger identifier on each of the character keys, contributing to touch typing practice. The keyboard cover can be attached/detached easily. Therefore, for a keyboard device commonly used by a plurality of users, it is possible to attach the keyboard cover only when a user among the users requires touch-typing practice so that the user can practice touch typing.

According to a fourth aspect of the present invention, there is provided a keyboard cover comprising key cover cells which cover a plurality of character keys of a keyboard device respectively, the character keys having identical shapes, each of the key cover cells including a finger identifier identifying a kind of a finger with which each of the character keys is to be pressed; wherein the finger identifier is provided on each of the key cover cells such that the finger identifier is provided on a left side of a key cover cell among the key cover cells for a character key among the character keys which is to be pressed by the left hand and on a right side of a key cover cell for a character key which is to be pressed by the right hand.

According to the present invention, the keyboard cover of the present invention can be attached to a commercially available keyboard to thereby provide the finger identifier for each of the character keys. In addition, the left-right identification function is also provided based on the position at which the finger identifier is provided. Therefore, the keyboard cover can contribute to touch-typing practice. In the third and fourth aspects, the keyboard cover may include a key cover cell of a different shape or size from that of each of the key cover cells covering the character keys having the identical shapes, such as a key cover cell covering the return key.

According to a fifth aspect of the present invention, there is provided a detachable label having the finger identifier and the left-right identifier used for the keyboard device of the present invention. According to a sixth aspect of the present invention, there is provided a detachable label having the finger identifier used for the keyboard device of the present invention.

According to the present invention, by adhering or attaching the label having the finger identifier and the left-right identifier to a commercially available keyboard device, or by adhering the label having the finger identifier to a commercially available keyboard device at a left or right predetermined position, such keyboard device can be imparted with the finger identification and left-right identification functions. In addition, by adhering the label having the finger identifier or the left-right identifier only to a key or keys for which finger operation the user is not fully confident, the user can practice touch typing efficiently.

In the keyboard device of the present invention, the left-right identifier and the finger identifier may be included in a same mark; the mark may be colored differently depending on the kind of the finger with which each of the character keys is to be pressed; and the finger identifier may be constructed of a pattern including plurality of marks and the pattern may differ for each finger. By devising the mark color and/or the mark pattern, it is possible to enhance the left-right identification function and the finger identification function of the identifier.

In the keyboard device of the present invention, the finger identifier may be constructed of a pattern including a plurality of marks; the pattern may differ for each finger; and the finger identifier may be provided on each of the characters keys such that the finger identifier provided on a character key among the character keys which is to be pressed by the left hand is mirror symmetric with respect to the finger identifier provided on a character key which is to be pressed by the right hand. By providing the finger identifiers for the left and right hands to be in mirror symmetry, left-right identification or discrimination can be done more effectively.

In the keyboard device of the present invention, the finger identifier may be constructed of a pattern of a single mark or of a plurality of marks; and a number of marks may differ for each finger. By adopting such mark, the identification function of the finger identifier can be further enhanced.

In the label of the present invention, each of the finger identifier and the left-right identifier may be a pattern having an upturned L-shape or a pattern obtained by inverting the upturned L-shape along an upper left corner portion or an upper right corner portion of each of the character keys, depending on the left or right hand by which each of the character keys is to be pressed, the pattern being colored differently depending on the kind of the finger with which each of the character keys is to be pressed. Since the label is detachably provided, the label can be used for a keyboard device and a keyboard cover which are not provided with the finger identifier and/or the left-right identifier. For example, it is possible to adhere the label of the present invention to each of the character keys of a commercially available keyboard device or to each of key cover cells of a commercially available keyboard cover covering the character keys respectively.

By doing so, it is possible to instantly discriminate the finger and the hand with which each of the character keys is to be pressed.

In this application, the term "keyboard device" is a concept encompassing not only a single keyboard device separated from the computer body, but also a keyboard portion of a notebook (laptop) computer and a keyboard portion of liquid crystal display built-in computer (LCD built-in computer). The term "character key" is a key which is pressed singly or together with a shift key to input an alphabet letter, a number or a symbol. Further, the phrase "keys having identical shapes" means that the keys themselves are identical in shape or in size, but excludes any difference in the printing or engrave of a number and/or a letter provided on the key top (upper surface of the key); any difference in a projection indicating the home position; and any difference in the left-right identifier and the finger identifier according to the present invention.

LEGENDS OF REFERENCE NUMERALS

10, 45: keyboard device; 11, 21, 31, 32, 41L, 41R, 42, 62L, 62R: identifier; 46: notebook (laptop) personal computer; 50, 60: keyboard cover

BEST MODE FOR CARRYING OUT THE INVENTION

Embodiments of the keyboard device of the present invention will be explained below with reference to the drawings.

First Embodiment

Figure 1:
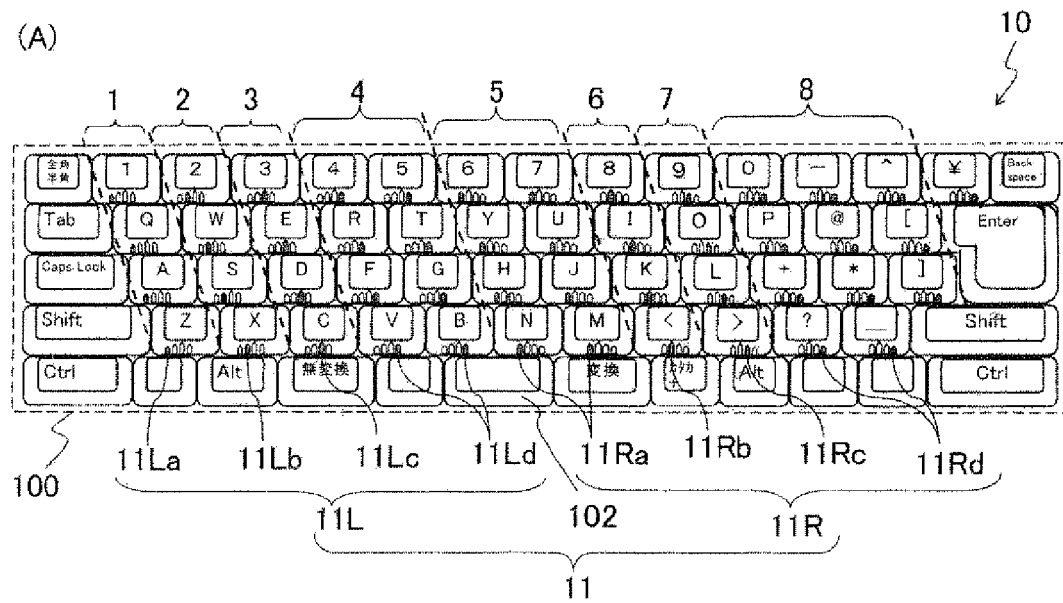
FIG. 1(A) is a top view of a keyboard device according to a first embodiment.
FIG. 1(B) is an enlarged view of projections provided on the front surfaces of character keys.
Figure 1:
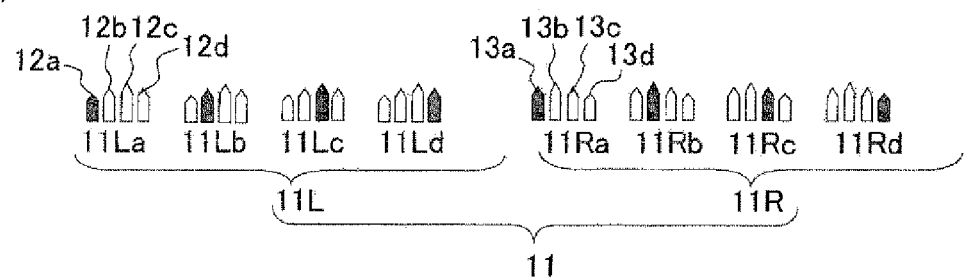
Figure 2:
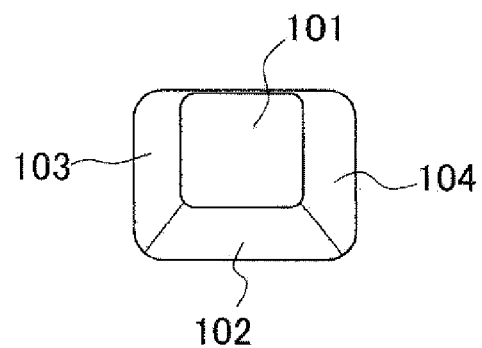
FIG. 2 is a top view of a character key of the keyboard device.

FIG. 1(A) shows a keyboard device according to the first embodiment. A keyboard device 10 has a board 100, character keys arranged in the "QWERTY" arrangement and supported on the board 100, an enter key supported on the board 100, and functions keys such as a shift key and a control key supported on the board 100. The character keys are formed to have identical shapes of a quadratic prism in which the bottom surface is larger to some extent than a key top (top surface) 101, and a front surface 102, a left surface 103 and a right surface 104 of the key are all trapezoid (FIG. 2). Note that all the corners of the key are chamfered, and the key top 101 is U-shaped in which the central portion of the key top 101 is sunken in the lateral direction. Each of the keys is supported on the board 100 by means of a method same as any known, conventional method for supporting keys on a keyboard device, and the keys may be supported by a leaf spring, a coil spring, etc. Further, the structure for connecting the keys with electrical circuits accommodated in the keyboard device and/or with the body of the personal computer is also same as any known, conventional connection method, for which any explanation is omitted here.

The character keys of the keyboard device 10 can be divided into area 1 to 8. Namely, an area 1 having keys of "1", "Q", "A" and "Z"; an area 2 having keys of "2", "W", "S" and "X"; an area 3 having keys of "3", "E", "D" and "C"; an area 4 having keys of "4", "5", "R", "T", "F", "G", "V" and "B"; an area 5 having keys of "6", "7", "Y", "U", "H", "J", "N" and "M"; an area 6 having keys of "8", "I", "K" and "<"; an area 7 having keys of "9", "O", "L" and ">"; and an area 8 having keys different from the keys belonging to each of the areas 1 to 7.

In the keyboard device 10, each of the character keys has an identifier 11 which is formed as four projections having an elliptical-shape (pencil-like shape) and raised from a side surface on the front side of the key. The identifier 11 is roughly classified into two groups of a left-hand identifier 11L and a right-hand identifier 11R by a combination of the shapes of four projections. As shown in FIG. 1(B), four projections (indicated in the drawing as 12a to 12d from the left) as the left-hand identifier 11L are formed to have lengths such that among the four projections, the projection 12c is the longest, the projection 12a is the shortest, and the projections 12b and 12d are approximately same in the length. Further, four projections (indicated in the drawing as 13a to 13d from the left) as the right-hand identifier 11R are formed to have lengths such that among the four projections, the projection 13b is the longest, the projection 13d is the shortest, and the projections 13a and 13c are approximately same in the length. The left-hand and right-hand identifiers 11L, 11R graphically show the shapes of the fingers of the left and right hands, respectively, as seen from the back of the hands. The projections 12a to 12d correspond to the little, ring, middle and index fingers of the left hand respectively; and the projections 13a to 13d correspond to the index, middle, ring and little fingers of the right hand respectively. Among the character keys of the keyboard device 10, character keys in the areas 1 to 4 to be pressed by the left hand (left hand region) are each provided with the left-hand identifier 11L, and character keys in the areas 5 to 8 to be pressed by the right hand (right hand region) are each provided with the right-hand identifier 11R.

Each of the keys in the areas 1 to 4 is formed such that one of the projections 12a, 12b, 12c and 12d is higher (projected higher) than the remaining three projections in the key, and each of the keys in the areas 5 to 8 is formed such that one of the projections 13a, 13b, 13c and 13d is higher (projected higher) than the remaining three projections in the key. In this manner, the projection formed to be higher than the remaining projections indicates the finger with which the key is to be pressed. Namely, as shown in FIGS. 1(A) and 1(B), each of the character keys in the areas 1 to 4 is provided with one of left-hand identifiers 11La, 11Lb, 11Lc and 11Ld in which one of the projections 12a, 12b, 12c and 12d is formed to be higher than the remaining three projections in the key. Further, each of the character keys in the areas 5 to 8 is provided with one of right-hand identifiers 11Ra, 11Rb, 11Rc and 11Rd in which one of the projections 13a, 13b, 13c and 13d is formed to be higher than the remaining three projections in the key.

Accordingly, each of the character keys has not only the left-hand identifier 11L or the right-hand identifier 11R, but also the identifier indicating the finger with which the key is to be pressed. Namely, the identifiers provided on each of the keys have the function to visually indicate hand information with which one of the left and right hands the key is to be typed (pressed) and finger information with which finger the key is to be typed, respectively.

Next, an explanation will be given about advantages obtained by using the keyboard device of this embodiment. For performing touch typing, both of the hands are first placed on the so-called "home position". Namely, the index, middle, ring and little fingers of the left hand are placed on the "F", "D", "S" and "A" keys respectively, and the index, middle, ring and little fingers of the right hand are placed on the "J", "K", "L" and "; (+)" keys respectively. Upon pressing a certain key, only a finger with which the key is to be pressed is moved, and fingers other than this finger are preferably remained on the home position. At this time, each of the character keys is provided with the identifier indicating with which finger the key is to be pressed. Therefore, there is no fear that a wrong finger is used to type during touch-typing practice, thereby making it possible to learn how to use the fingers correctly.

In addition, even when the user is typing by the self-taught method rather than during touch-typing practice, the keyboard device of the invention is helpful. In general, when a non-touch typing user intends to press a certain key, the user visually seeks a key desired to press, relying on the indication provided on the key top. Upon using the keyboard device of the invention, whenever the user finds and presses the desired key, the user at the same time confirms the identifier attached to the front surface of the key. In other words, every time the user presses a key, it is possible to visually confirm with which finger of which of the left and right hands the key should be pressed. By repeating such confirmation every time a key is pressed, assistance is given for the user to memorize the key arrangement image even without special touch-typing practice.

By providing, on each of the character keys, a combination of the images of finger and hand corresponding to the key, great assistance is provided to visually grasp key arrangement which would be otherwise uninteresting. By practicing touch typing after grasping the key arrangement and the finger usage to press the keys to some extent, it is possible to master the touch typing technique more quickly and correctly.

Further, since the identifier 11 of the embodiment is the projections formed on the front surface of each of the character keys, the identifier 11 is capable of making the user visually recognize the information about the left or right hand with which the key is to be pressed and the information about the finger with which the character key is to be pressed, as well as is capable of making the user recognize this information through a tactile sense when the user touches the key with the fingertip, etc. For example, by touching the identifier 11, even a blind person can recognize, via the tactile sense, with which hand and which finger a key is to be pressed. Furthermore, since the identifier 11 is provided on each of the character keys at a same position, there is no need to look for, regarding every character key, a position at which the identifier is located. The identifier of the embodiment can also be provided on a Braille keyboard. In this case, the identifier is particularly effective when a blind person practices touch typing.

First Modification

Figure 3:
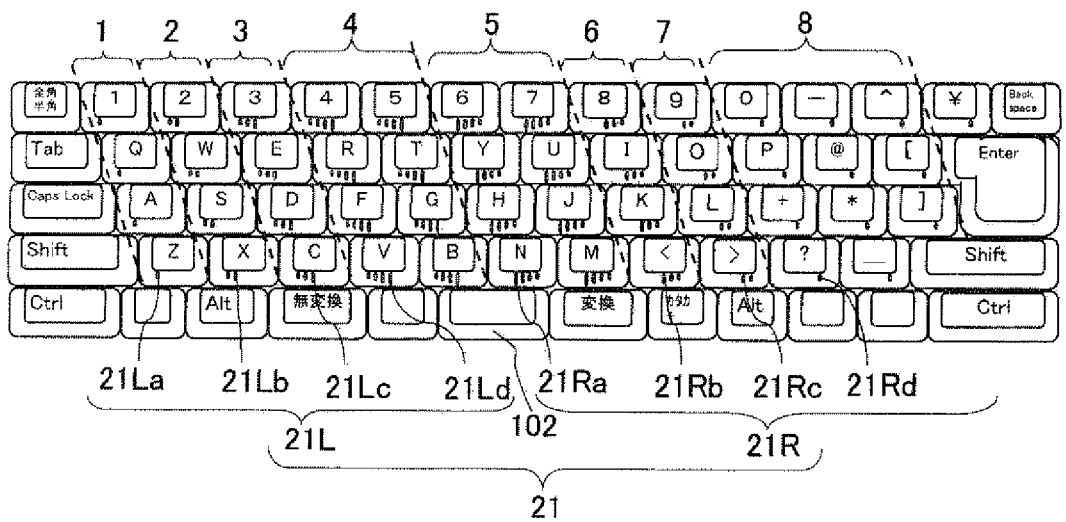
FIG. 3(A) is a top view of a keyboard device according to a first modification.
FIG. 3(B) is an enlarged view of projections provided on the front surfaces of the character keys.
Figure 3:
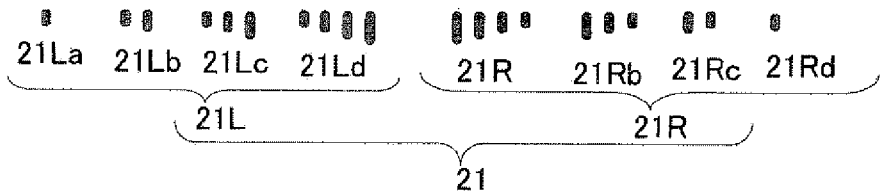

In the first modification, each of the character keys is provided with an identifier 21 formed as one, two, three or four projections raised from a side surface 102 on the front side of the character key. As shown in FIGS. 3(A) and 3(B), the projections are formed in a shape of vertically oblong ellipsoid, and are arranged in a horizontal row at regular intervals with upper ends of the projections being aligned. The shape and arrangement of the projections of the identifier 21 has a function of left-right identification as follows. With respect to the left hand region, a projection of an identifier 21L is provided on the front surface of the key from the left edge thereof. When there is a plurality of projections in the identifier 21L, then the projections are formed to be longer toward the right side. With respect to the right hand region, a projection of an identifier 21R is provided on the front surface of the key from the right edge thereof. When there is a plurality of projections in the identifier 21R, then the projections are formed to be longer toward the left side. In addition, the number of the projections of the identifiers 21L, 22R has a function of finger identification. Namely, in the left hand region, an identifier 21Ld in an area 4 to be pressed with the index finger (index finger area) is four projections; an identifier 21Lc in an area 3 to be pressed with the middle finger (middle finger area) is three projections; an identifier 21Lb in an area 2 to be pressed with the ring finger (ring finger area) is two projections; and an identifier 21La in an area 1 to be pressed with the little finger (little finger area) is one projection. Similarly, in the right hand region, an identifier 21Ra in an area 5 to be pressed with the index finger (index finger area) is four projections; an identifier 21Rb in an area 6 to be pressed with the middle finger (middle finger area) is three projections; an identifier 21Rc in an area 7 to be pressed with the ring finger (ring finger area) is two projections; and an identifier 21Rd in an area 8 to be pressed with the little finger (little finger area) is one projection. Accordingly, the identifier 21 provided on each of the character keys has the left-right identification function and the finger identification function based on the shape, arrangement and number of the projections, serving both as the left-right identifier and the finger identifier.

Second Embodiment

Figure 4:
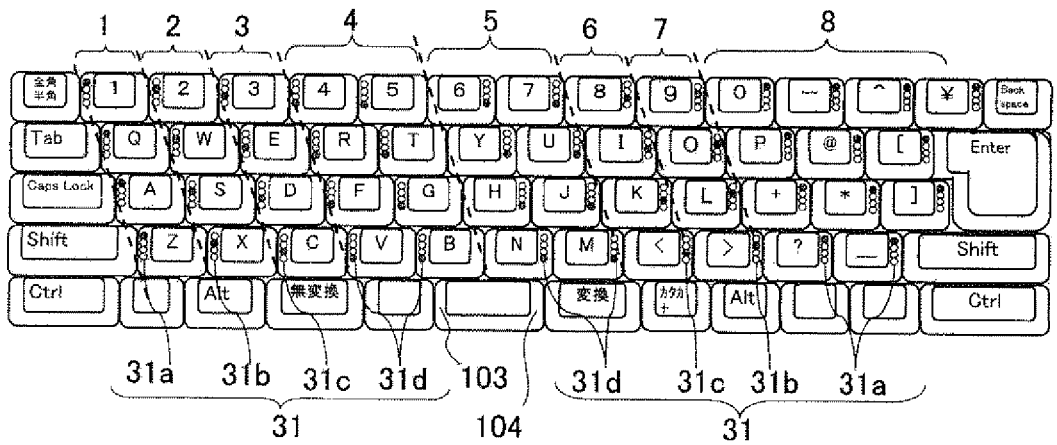
FIG. 4(A) is a top view of a keyboard device according to a second embodiment.
FIG. 4(B) is an enlarged view of projection/recess portions provided on the front surfaces of the character keys.
Figure 4:
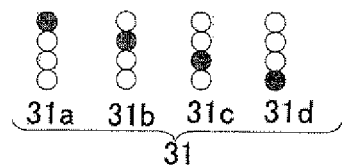

FIG. 4(A) shows a keyboard device of the second embodiment. Each of the character keys is provided with an identifier 31 formed as four projection/recess portions projecting (raised) and recessed (sunk) from the left or right side wall surface of the character key. Each of the character keys in the left hand region has the identifier 31 on a left side surface 103 of the character key; and each of the character keys in the right hand region has the identifier 31 on a right side surface 104 of the character key. The identifier 31 is formed of four projection/recess portions aligned in the vertical direction, among which only one is a projection and remaining three are recesses. The projection/recess portions of identifiers 31a, 31b, 31c and 31d in the index, middle, ring and little finger areas respectively are formed such that the projection is provided only at the first, second, third and fourth position from the top, respectively (see FIG. 4(B)). Therefore, the left-right identification and the finger identification can be made based on the position of the identifier 31 and the position of the projection in the identifier 31 provided on each of the character keys. In this manner, although the identifier 31 itself has only the finger identification function, the left-right identification function can be obtained by arranging the identifier 31 at the left or right side.

Second Modification

Figure 5:
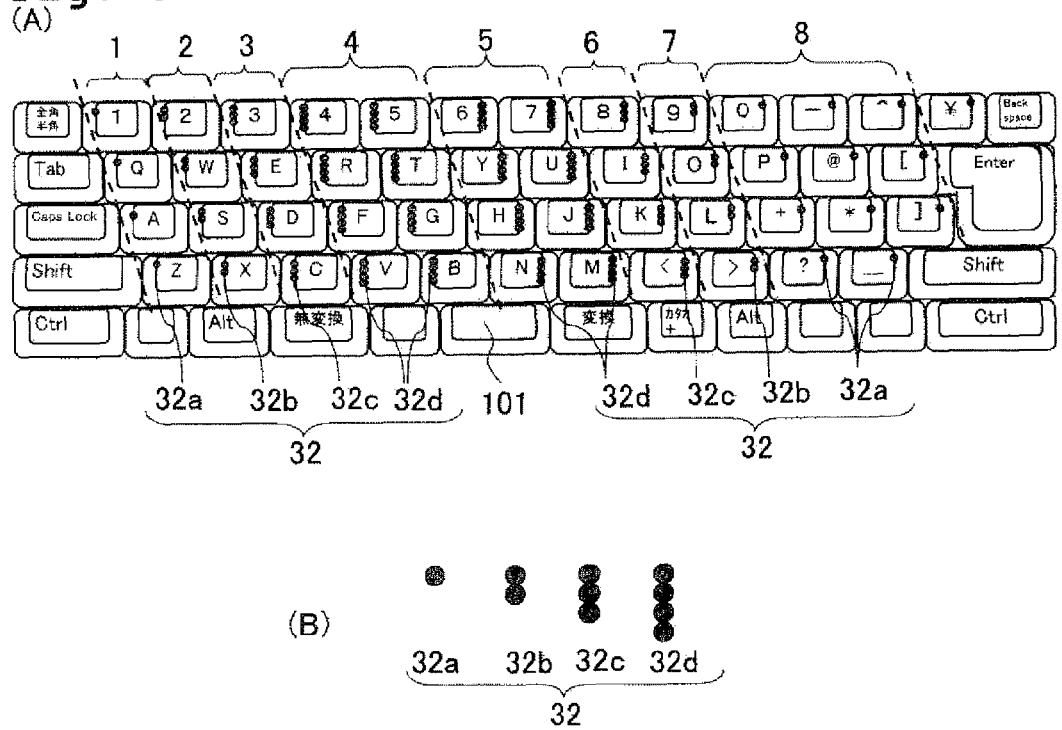
FIG. 5(A) is a top view of a keyboard device according to a second modification.
FIG. 5(B) is an enlarged view of projections provided on the front surfaces of the character keys.

FIG. 5(A) shows a keyboard device of the second modification. Each of character keys in the left hand region is provided with an identifier 32 formed on the left side of the key top 101 as one, two, three or four projections raised from the surface of the key top 101. Each of character keys in the right hand region is provided with an identifier 32 formed on the right side of the key top 101 and similar to that in the left-hand area. The one to four projections of the identifier 32 are arranged in a row in the vertical direction (Y direction). Identifiers 32a, 32b, 32c and 32d in the index, middle, ring and little finger areas are formed as four projections, three projections, two projections and one projection respectively (see FIG. 5(B)). Accordingly, not only the finger identification function is provided by the number of the projections in the identifier 32, but also the left-right identification function is provided by arranging the identifier 32 on the left or right side of the key top 101. In this case, since the identifier 32 is arranged at the key top 101, the feature of this modification is that the identifier 32 has a high visual recognizability.

Third Embodiment

Figure 6:
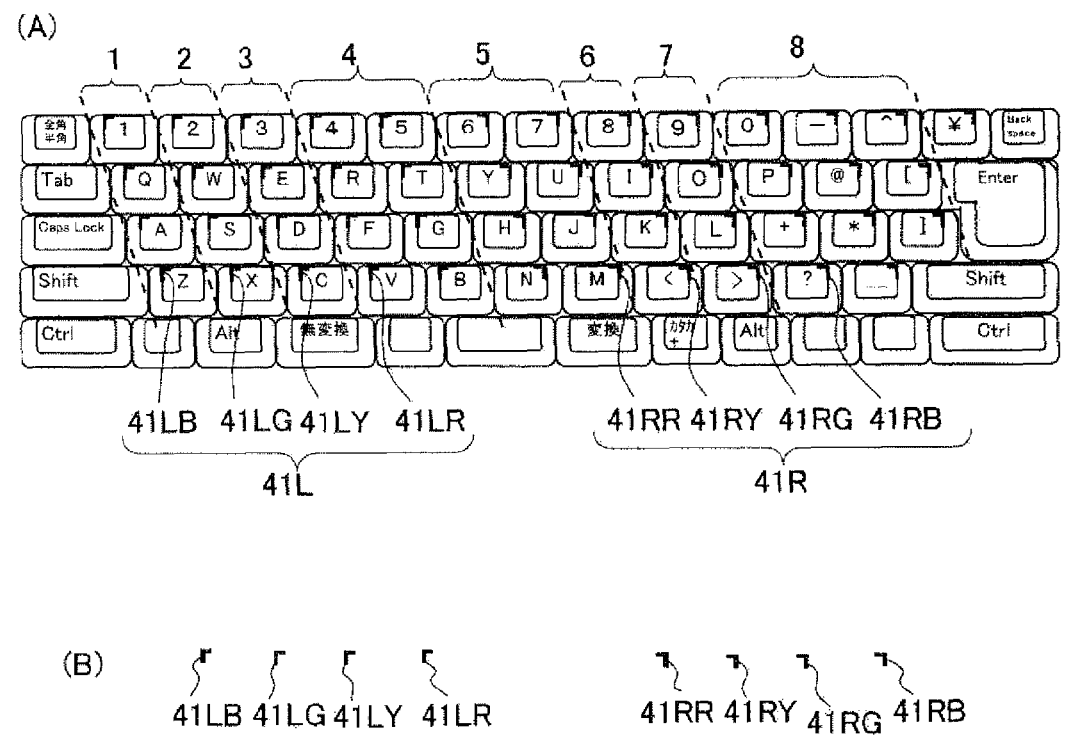
FIG. 6(A) is a top view of a keyboard device to which removable identifiers according to a third embodiment are adhered.
FIG. 6(B) is an enlarged view of the identifiers which are removable stickers.

In the third embodiment, an identifier 41L is provided on the left side of the key top of each of the character keys in the left hand region, and an identifier 42R is provided on the right side of the key top of each of the character keys in the right hand region; and the identifiers have identical shapes in each of the left hand region and the right hand region. As shown in FIG. 6(A), a keyboard device of the third embodiment is provided with character keys each of which has a label (sticker member) at the upper left or upper right position of the key top 101, the label having an identifier 41L or an identifier 41R. The label is formed of a flexible plastic sheet having adhesive coated on the back surface of the plastic sheet. The identifier 41L for the character keys in the left hand region is a mark which has an upturned L-shape covering the left corner portion of the key top and which is constructed of two extending portions extending from the upper left top of the key top to the rightward and downward directions respectively. The identifier 41R for the character keys in the right hand region is a mark which is obtained by inverting the upturned L-shape, which covers the right corner portion of the key top, and which is constructed of two extending portions extending from the upper right top of the key top to the leftward and downward directions respectively. The identifiers 41L and 42R have shapes which are symmetrical to each other with respect to the central axis of the key in the vertical direction (mirror image). In the left hand region, an identifier 41LB in the little finger area is colored in blue, an identifier 41LG in the ring finger area is colored in green, an identifier 41LY in the middle finger area is colored in yellow, and an identifier 41LR in the index finger area is colored in red. Similarly, in the right hand region, an identifier 41RB in the little finger area is colored in blue, an identifier 42RG in the ring finger area is colored in green, an identifier 42RY in the middle finger area is colored in yellow, and an identifier 42RR in the index finger area is colored in red. In such a manner, the identifier 41 is provided on the character key in the left hand region at the upper left corner portion of the key top 101, and the identifier 41 is provided on the character key in the right hand region at the upper right corner portion of the key top 101, thereby making it possible to impart the left-right identification function to the identifiers 41 L, 41 R. Further, all the identifiers 41 L attached to the character keys in the left hand region have identical shapes, and all the identifiers 41R attached to the character keys in the right hand region also have identical shapes. Therefore, although it is not possible to identify (discriminate) the finger with which the key is to be pressed based on the shapes of the identifiers 41L, 41R alone, the finger identification function can be imparted to the identifiers 41L, 41R by changing the color of the identifiers 41L, 42R for each of the fingers. Namely, in this embodiment, each of the identifiers 41L, 41R which is formed as single label serves both as the left-right identifier and the finger identifier. In particular, it is noted that such a single mark includes both the left-right identification function and the finger identification function.

Figure 7:
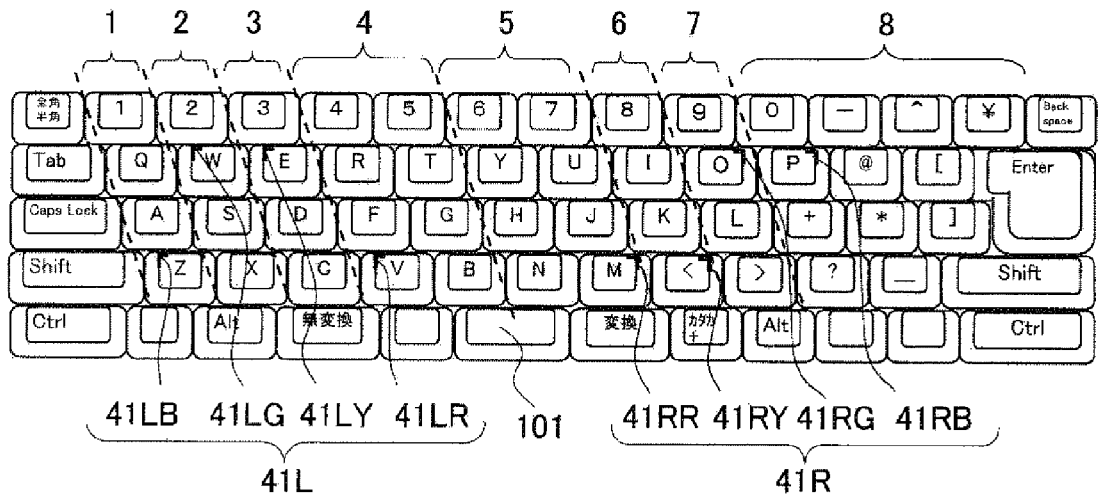
FIG. 7 is a top view of a keyboard device in which the removable identifiers of the third embodiment are attached to a part of the keys.

In this embodiment, the identifiers 41L, 42R are not formed integrally with the character keys of the keyboard device. Rather, each of the identifiers 41L, 42R is provided as a label having glue or adhesive applied on the back surface of the label, and is detachable (removable) from the character key. It is also allowable to adhere the labels of the identifiers 41L, 41R to the character keys of a commercially available keyboard which is otherwise not provided with any identifier. The labels having the identifiers 41L, 41R are also an aspect of the invention. For example, there is no need to adhere the labels having the identifiers 41L, 41R to all of the character keys; it is allowable, as shown in FIG. 7, to adhere the labels having the identifiers 41L, 41R only to a part of the character keys for which finger operation the user is not fully confident, and to use the labels. Note that the label of the identifier 41L, 41R may be formed by painting or printing the upturned L-shape mark or an inverted image of the upturned L-shaped mark on a transparent sheet having adhesive applied thereto and to be arranged on the key top to cover the character key. The label may cover a portion or part of the key top, or may cover the entirety of the key top. The label may have any shape and size.

In this embodiment, the labels having the identifiers 41L, 41R are detachable. However, marks which are same as those of the labels may be integrally formed on the character keys upon producing the character keys. Alternatively, the identifiers 41L, 41R may be provided on the character keys by means of printing. Further, the identifiers 41L, 41R may be a planar mark having little thickness, or may be a three-dimensional mark having a thickness to an extent that the mark can be recognized by the sense of touch.

Third Modification

Figure 8:
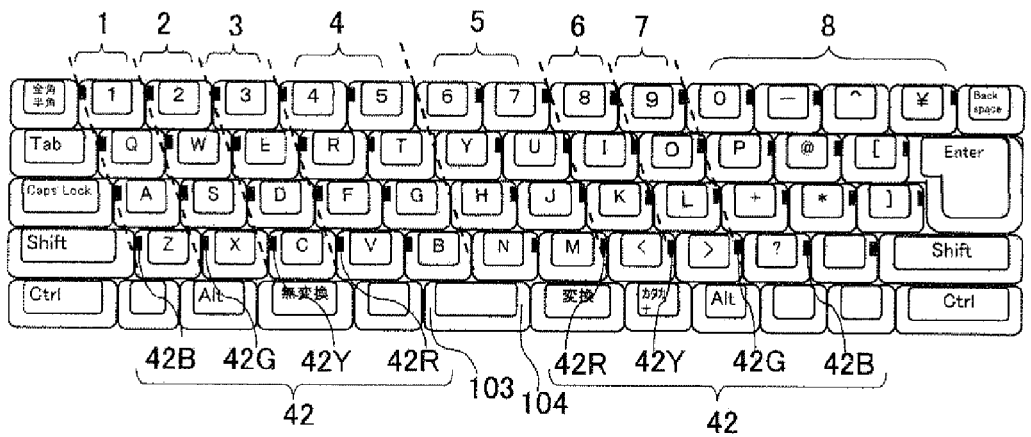
FIG. 8(A) is a top view of a keyboard device according to a third modification.
FIG. 8(B) is an enlarged view of color portions each provided on a side surface of one of the character keys.
Figure 8:
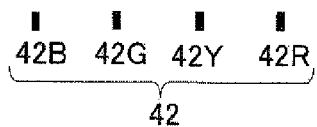

The third modification is same as the third embodiment except that identifiers 42 are each provided on a side surface of the key, rather than on the key top. FIG. 8(A) shows a keyboard device of the third modification. In the left hand region, each of the character keys is provided with a label having the identifier 42, on a left side surface 103 of the character key; and in the right hand region, each of the character keys is provided with a label having the identifier 42, on a right side surface 104 of the key. The shapes of the labels are all rectangular and the identifier 42 of each of the labels is colored for each of the fingers by which the key is to be pressed, in a similar manner as the identifiers in the third embodiment. Namely, an identifier 42B in the little finger area is colored in blue, an identifier 42G in the ring finger area is colored in green, an identifier 42Y in the middle finger area is colored in yellow, and an identifier 42R in the index finger area is colored in red (see FIG. 8(B)). In such a manner, with the identifier having only the finger identification function, it is possible to obtain the left-right identification function by arranging the identifier on the right side of the key in the right hand region and by arranging the identifier on the left side of the key in the left hand region.

Fourth Embodiment

Figure 9:
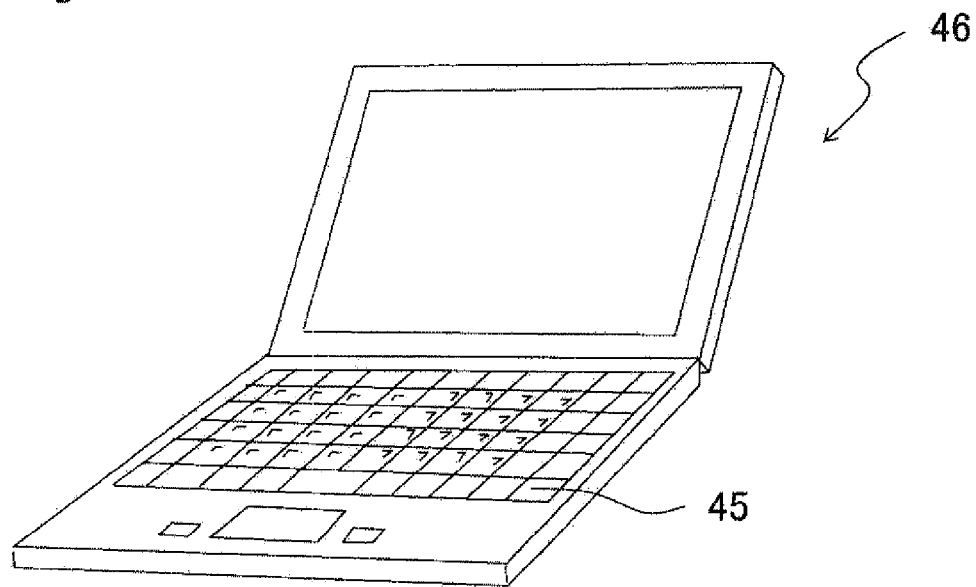
FIG. 9 is a schematic view of a notebook personal computer according to a fourth embodiment.

A keyboard device 45 of the fourth embodiment is the same as that in the third embodiment except that the keyboard device 45 is a keyboard portion of a notebook personal computer, rather than a separate keyboard device (see FIG. 9). In such a manner, the invention is applicable to the keyboard portion of a notebook personal computer, a built-in keyboard portion of a liquid crystal display built-in computer (LCD built-in computer), etc.

Fifth Embodiment

Figure 10:
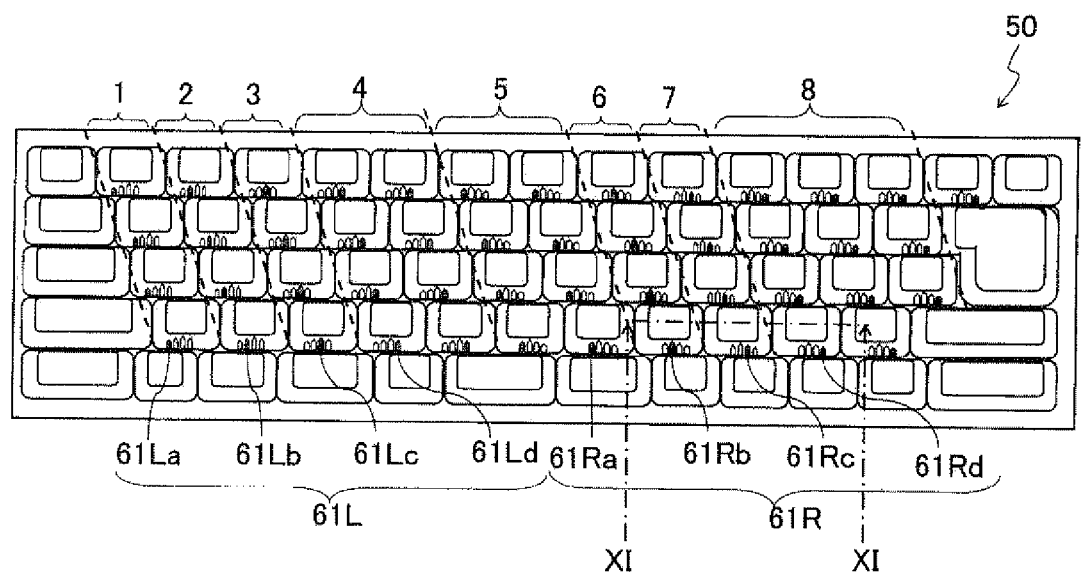
FIG. 10 is a top view of a keyboard cover according to a fifth embodiment.
Figure 11:
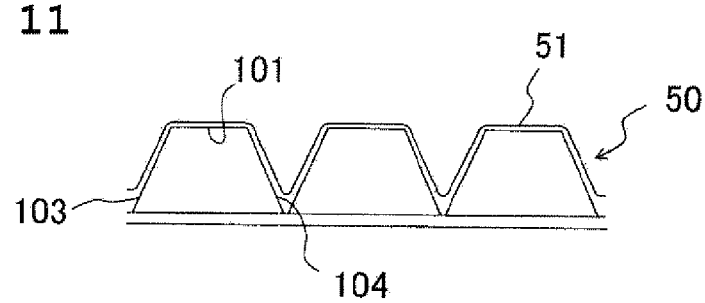
FIG. 11 is a sectional view taken along a XI-XI line of FIG. 10.

The fifth embodiment is an example using a keyboard cover having the identifiers. A keyboard cover 50 of the embodiment is a translucent keyboard cover formed of a silicone material. As shown in FIG. 10, the keyboard cover 50 has key cover cells 51 (key accommodating portions) accommodating the keys in the keyboard device respectively, and a left-hand identifier 61L or a right-hand identifier 61R is attached to the front surface of each of the key cover cells 51 (a portion, of each of the key cover cells 51, corresponding to the front surface of each of the keys). As shown in FIG. 11, each of the keys has a substantially cuboid shape; and each of the key cover cells 51 has a form of an open box-shaped bag covering a top surface 101 (key top), a front surface 102, a rear surface, a left side surface 103 and a right side surface 104 of the key. The shapes and the structures of the left-hand identifier 61L and the right-hand identifier 61R are the same as those of the left-hand identifier 11L and the right-hand identifier 11R of the first embodiment, respectively. By attaching the keyboard cover 50 having both of the left-right identification function and the finger identification function to a commercially available keyboard, it is possible to impart the left-right identification function and the finger identification function to each of the character keys.

Sixth Embodiment

Figure 12:
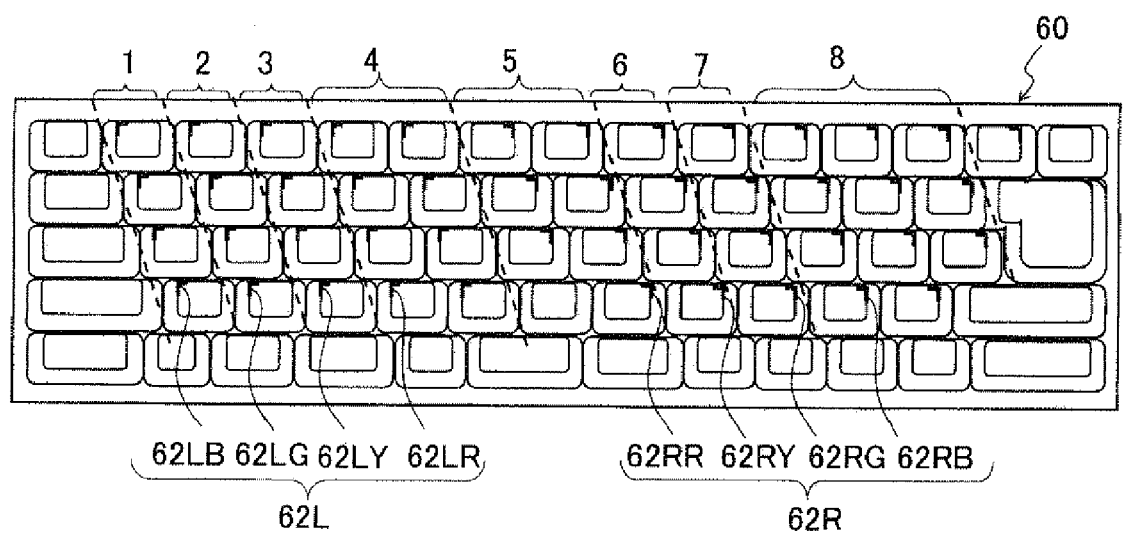
FIG. 12 is a top view of a keyboard cover according to a sixth embodiment.

A keyboard cover 60 of the sixth embodiment is provided with an identifier 62L and an identifier 62R (FIG. 12) of which shape and color are the same as those of the identifier 41L and the identifier 41R of the third embodiment. Namely, in this embodiment, the identifiers 62L of the keyboard cover 60 are provided with respect to the key character in the left hand region, at a portion corresponding to the upper left corner portion of the key top; and the identifiers 62R are provided with respect to the key character in the right hand region, at a portion corresponding to the upper right corner portion of the key top. The identifiers 62L, 62R are colored in different colors for each of the fingers with which the keys are to be pressed, respectively. Namely, in the left hand region, an identifier 62LB in the little finger area is colored in blue, an identifier 62LG in the ring finger area is colored in green, an identifier 62LY in the middle finger area is colored in yellow, and an identifier 62LR in the index finger area is colored in red. In the right hand region, an identifier 62RB in the little finger area is colored in blue, an identifier 62RG in the ring finger area is colored in green, an identifier 62RY in the middle finger area is colored in yellow, and an identifier 62RR in the index finger area is colored in red. In such a manner, by attaching the keyboard cover, which is provided with the finger identifiers and in which the left-right identification can be made by the arrangement of the identifiers, to a commercially available keyboard device, it is possible to identify the hand and a finger of the hand with which each of the character keys is to be pressed.

The shape, coloring, position and material of the finger identifier and of the left-right identifiers of the keyboard device, the keyboard cover, or the label of the present invention are not limited to the above-described embodiments. These elements are arbitrary provided that the elements have the left-right identification function and the finger identification function.

Industrial Applicability

The keyboard device, keyboard cover or label of the present invention is applicable for a personal use to assist the practice for mastering touch typing, but is also useful in a school or personal computer school upon conducting a personal computer class. For example, upon explaining to a large number of students to input "HELP", it is possible to explain, even to a beginner student who does not memorize the key position at all, that the keys for inputting "HELP" are keys to be pressed with "right hand, index finger", "left hand, middle finger", "right hand, ring finger" and "right hand, little finger". In turn, the student who listened to the explanation can seek the position of each of the keys corresponding to the characters for inputting "HELP" without hesitation, and to press the keys with the designated fingers. In this manner, even with a beginner who does not memorize the key positions at all, it is possible to explain the premise of touch typing. Therefore, the keyboard device, keyboard cover or label of the present invention is effective also as educational material.

The invention claimed is:

1. A keyboard device comprising a plurality of character keys having identical shapes, each of the character keys including a finger identifier identifying a kind of a finger with which each of the character keys is to be pressed, the finger identifier for a left hand being mirror symmetrical with respect to the finger identifier for a right hand;
wherein corresponding to a QWERTY arrangement, the plurality of character keys are divided into eight areas including:
a first area having the character keys of "1", "Q", "A" and "Z";
a second area having the character keys of "2", "W", "S" and "X";
a third area 3 having the character keys of "3", "E", "D" and "C";
a fourth area having the character keys of "4", "5", "R", "T", "F", "G", "V" and "B";
a fifth area having the character keys of "6", "7", "Y", "U", "H", "J", "N" and "M";
a sixth area having the character keys of "8", "I", "K" and "<";
a seventh area having the character keys of "9", "O", "L" and ">"; and
an eighth area having the character keys different from the character keys belonging to each of the first to seventh areas,
wherein in the first to fourth areas, each of the finger identifiers is arranged at an upper left corner portion of a key top of each of the character keys without being arranged at an upper right corner portion thereof such that the finger identifiers also serve as a hand identifier and such that the character keys can be depressed without concealing any portion of the finger identifiers, and
wherein in the fifth to eighth areas, each of the finger identifiers is arranged at an upper right corner portion of a key top of each of the character keys without being arranged at an upper left corner portion thereof such that the finger identifiers also serve as a hand identifier and such that character keys can be depressed without concealing any portion of the finger identifiers.

2. The keyboard device according to claim 1, wherein the finger identifier is detachably provided.

3. The keyboard device according to claim 1, wherein in the first to fourth areas, each of the finger identifiers is a same mark for the plurality of character keys, and the mark is colored differently depending on the kind of the fingers with which each of the character keys is to be pressed,
in the fifth to eighth areas, each of the finger identifiers is a same mark for the plurality of character keys, and the mark is colored differently depending on the kind of the fingers with which each of the character keys is to be pressed, and
the colors in the first to fourth areas are different from the colors in the fifth to eighth areas, respectively.

4. The keyboard device according to claim 1, wherein in the first to fourth areas, each of the finger identifiers has a pattern having an upturned L-shape, and
in the fifth to eighth areas, each of the finger identifiers has a pattern obtained by inverting the upturned L-shape.

5. The keyboard device according to claim 1, wherein each of the finger identifiers is a planar mark.

6. A keyboard device comprising a plurality of character keys having identical shapes, each of the character keys including a finger identifier identifying a kind of a finger with which each of the character keys is to be pressed, a color or a shape of the finger identifiers being different from each other depending on the kinds of the fingers, and in each of the fingers, the finger identifier for a left hand being mirror symmetrical with respect to the finger identifier for a right hand;
wherein corresponding to a QWERTY arrangement, the plurality of character keys are divided into eight areas including:
a first area having the character keys of "1", "Q", "A" and "Z";
a second area having the character keys of "2", "W", "S" and "X";
a third area 3 having the character keys of "3", "E", "D" and "C";
a fourth area having the character keys of "4", "5", "R", "T", "F", "G", "V" and "B";
a fifth area having the character keys of "6", "7", "Y", "U", "H", "J", "N" and "M";

a sixth area having the character keys of "8", "I", "K" and "<";

a seventh area having the character keys of "9", "O", "L" and ">"; and an eighth area having the character keys different from the character keys belonging to each of the first to seventh areas, wherein in the first to fourth areas, each of the finger identifiers is arranged at a left side surface of a character key among the characters keys which is to be pressed by the left hand without being arranged at a right side surface thereof such that the finger identifiers also serve as a hand identifier, and in the fifth to eighth areas, each of the finger identifiers is arranged at a right side surface of a character key which is to be pressed by the right hand without being arranged at a left side surface thereof such that the finger identifiers also serve as a hand identifier.

7. The keyboard device according to claim 6, wherein the finger identifier is constructed of a pattern including a plurality of marks, and the pattern differs for each finger.

8. The, keyboard device according to claim 6, wherein the finger identifier is constructed of a pattern of a single mark or of a plurality of marks; and a number of mark differs for each finger.

9. The keyboard device according to claim 6, wherein the finger identifier is detachably provided.

10. The keyboard device according to claim 6, wherein in the first to fourth areas, each of the finger identifiers is a same mark for the plurality of character keys, and the mark is colored differently depending on the kind of the finger with which each of the character keys is to be pressed, in the fifth to eighth areas, each of the finger identifiers is a same mark for the plurality of character keys, and the mark is colored differently depending on the kind of the fingers with which each of the character keys is to be pressed, and the colors in the first to fourth areas are different from the colors in the fifth to eighth areas, respectively.

11. A keyboard cover comprising key cover cells which cover a plurality of character keys of a keyboard device respectively, the character keys having identical shapes, each of the key cover cells including a finger identifier identifying a kind of a finger with which each of the character keys is to be pressed, the finger identifier for a left hand being mirror symmetrical with respect to the finger identifier for a right hand;

wherein corresponding to a QWERTY arrangement, the plurality of character keys are divided into eight areas including:

a first area having the character keys of "1", "Q", "A" and "Z";

a second area having the character keys of "2", "W", "S" and "X";

a third area 3 having the character keys of "3", "E", "D" and "C";

a fourth area having the character keys of "4", "5", "R", "T", "F", "G", "V" and a fifth area having the character keys of "6", "7", "Y", "U", "H", "J", "N" and a sixth area having the character keys of "8", "I", "K" and "<";

a seventh area having the character keys of "9", "O", "L" and ">"; and an eighth area covering the character keys different from the character keys belonging to each of the first to seventh areas, wherein in the first to fourth areas, each of the finger identifiers is arranged on an upper left corner portion of each of the key cover cells without being arranged on an upper right corner portion thereof such that the finger identifiers also serve as a hand identifier, and wherein in the fifth to eighth areas, each of the finger identifiers is arranged on an upper right corner portion of each of the key cover cells without being arranged on an upper left corner portion thereof such that the finger identifiers also serve as a hand identifier.

12. The keyboard cover according to claim 11, wherein in the first to fourth areas, each of the finger identifiers is a same mark for the plurality of character keys; and the mark is colored differently depending on the kind of the fingers with which each of the character keys is to be pressed, in the fifth to eighth areas, each of the finger identifiers is a same mark for the plurality of character keys, and the mark is colored differently depending on the kind of the fingers with which each of the character keys is to be pressed, and the colors in the first to fourth areas are different from the colors in the fifth to eighth areas, respectively.

13. The keyboard cover according to claim 11, wherein each of the finger identifiers is a planar mark.

14. The keyboard cover according to claim 11, wherein in the first to fourth areas, each of the finger identifiers has a pattern having an upturned L-shape, and in the fifth to eighth areas, each of the finger identifiers has a pattern obtained by inverting the upturned L-shape.

\* \* \* \* \*